United States Patent [19]

Seed

[11] Patent Number: 4,558,756

[45] Date of Patent: Dec. 17, 1985

[54] CANTILEVER SUPPORT BEAM ASSEMBLY FOR A LOAD CELL AND THE LIKE

[75] Inventor: Aniese E. Seed, Toledo, Ohio

[73] Assignee: Toledo Transducers, Inc., Toledo, Ohio

[21] Appl. No.: 602,670

[22] Filed: Apr. 23, 1984

[51] Int. Cl.$^4$ .......................... G01G 3/08; G01G 3/14
[52] U.S. Cl. ..................................... 177/211; 177/229; 73/862.65
[58] Field of Search .............................. 177/211, 229; 73/862.65, 862.66

[56] References Cited

U.S. PATENT DOCUMENTS

| | | | |
|---|---|---|---|
| 3,602,866 | 8/1971 | Saxl | 177/211 X |
| 4,065,962 | 1/1978 | Shoberg | 73/862.65 |
| 4,146,100 | 3/1979 | Jacobson et al. | 177/211 |
| 4,212,197 | 7/1980 | Kawai et al. | 177/211 X |
| 4,459,863 | 7/1984 | Nordström | 177/211 X |

OTHER PUBLICATIONS

"Modern Strain Gage Transducers . . . ", Their Design and Construction, *Epsilonics*, vol. 2, No. 2, Jul. 1982, pp. 6–8.

*Primary Examiner*—E. A. Goldberg
*Assistant Examiner*—Patrick W. Foster
*Attorney, Agent, or Firm*—Emch, Schaffer Schaub & Porcello Co.

[57] ABSTRACT

An improved cantilever support beam assembly for a load cell and the like having a longitudinally extending support beam with two openings extending through the sidewalls of the beam. The openings are independent from one another and separated by a web. Strain gages, are mounted on the concave portions of the openings which are adjacent one another.

7 Claims, 4 Drawing Figures

CANTILEVER SUPPORT BEAM ASSEMBLY FOR A LOAD CELL AND THE LIKE

BACKGROUND OF THE INVENTION

This invention relates to an improved cantilever support beam assembly for a load cell and the like. Many weighing scales today use a group of electric strain gages to electronically determine the weight of an object placed upon the scale platform. The strain gages are mounted on the support beam of a load cell and connected to form a bridge circuit which measures variations in load upon the support beam. When there is no load upon the support beam the circuit is balanced. However, when a load is placed upon the beam, strains are set up which are sensed by the strain gages. The strain gages convert the strains into electric signals which place the bridge circuitry in an unbalanced state. If the load cell is properly designed, the amount of imbalance in the circuit is proportional to the weight of the object. If the load cell is not designed properly, the margin of error in the circuit will be great and as a result, the load cell readings will be inaccurate. Oftentimes, this error is due to beam design and the location of the strain gages.

It is therefore an object of the present invention to provide a support beam assembly for a load cell which has reduced error and increased accuracy. Other objects and advantages will become apparent from a review of the following specification and claims.

SUMMARY OF THE INVENTION

This invention relates to an improved cantilever support beam assembly for a load cell such as is commonly used in weighing scales. The assembly consists of a longitudinally extending support beam which is rigidly attached at one end. Extending through the sidewalls of the beam are two openings. The area of the beam between two the openings further defines a central region or vertical web. When a load is placed along the beam, the strains on the beam are measured by strain gages. In the preferrred embodiment four strain gages, two per opening, which are mounted one above the other on the portions of the concave surfaces of the openings adjacent the vertical web.

The circuitry for the strain gages is adjusted electrically to be balanced when there is no load on the cell. When a load is placed upon the cell, the design of the beam and the location of the gages yield a very accurate reading of the force that the load is exerting upon the load cell.

DESCRIPTION OF THE PREFERRED EMBODIMENT

Figure 1:
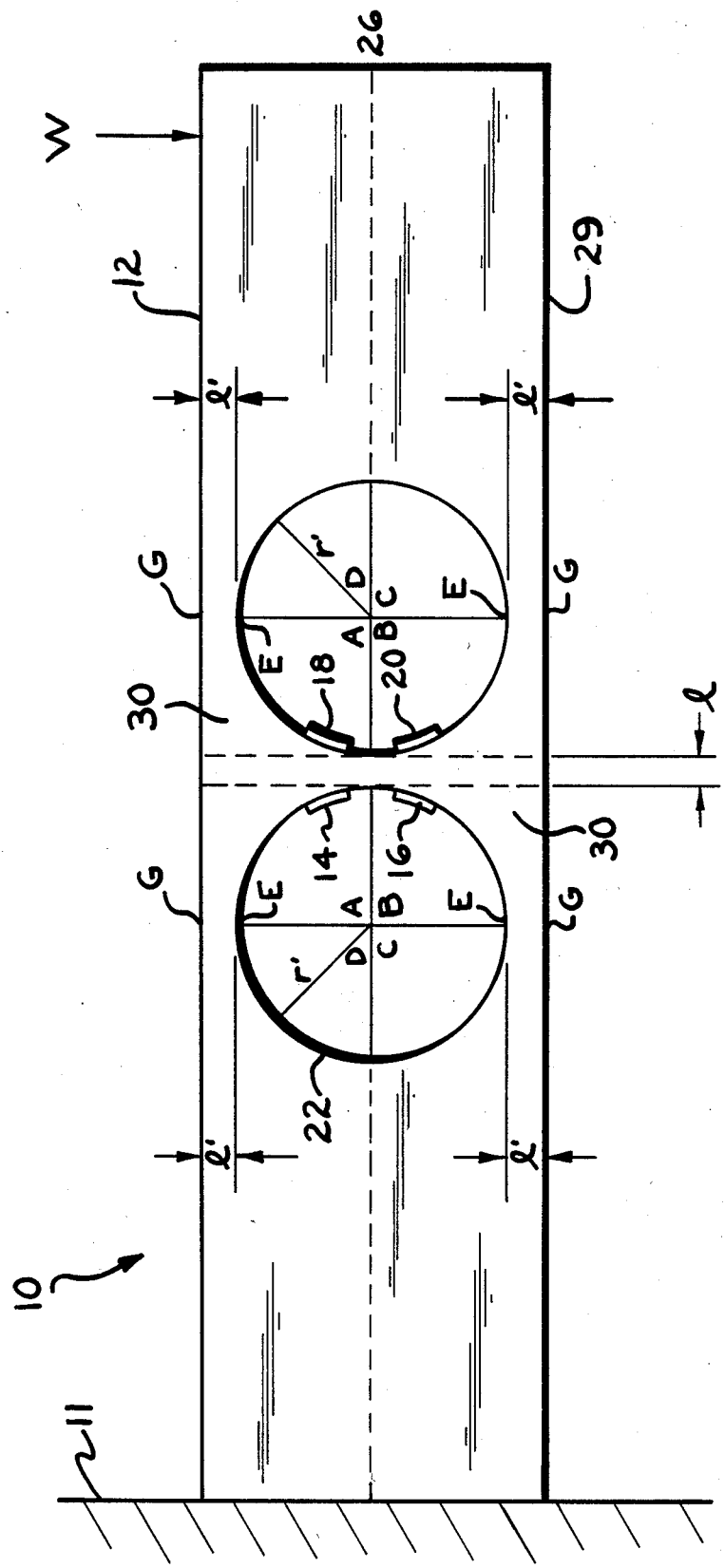
FIG. 1 is a side elevational view of a cantilever support beam assembly for a load cell, according to the present invention.
Figure 2:
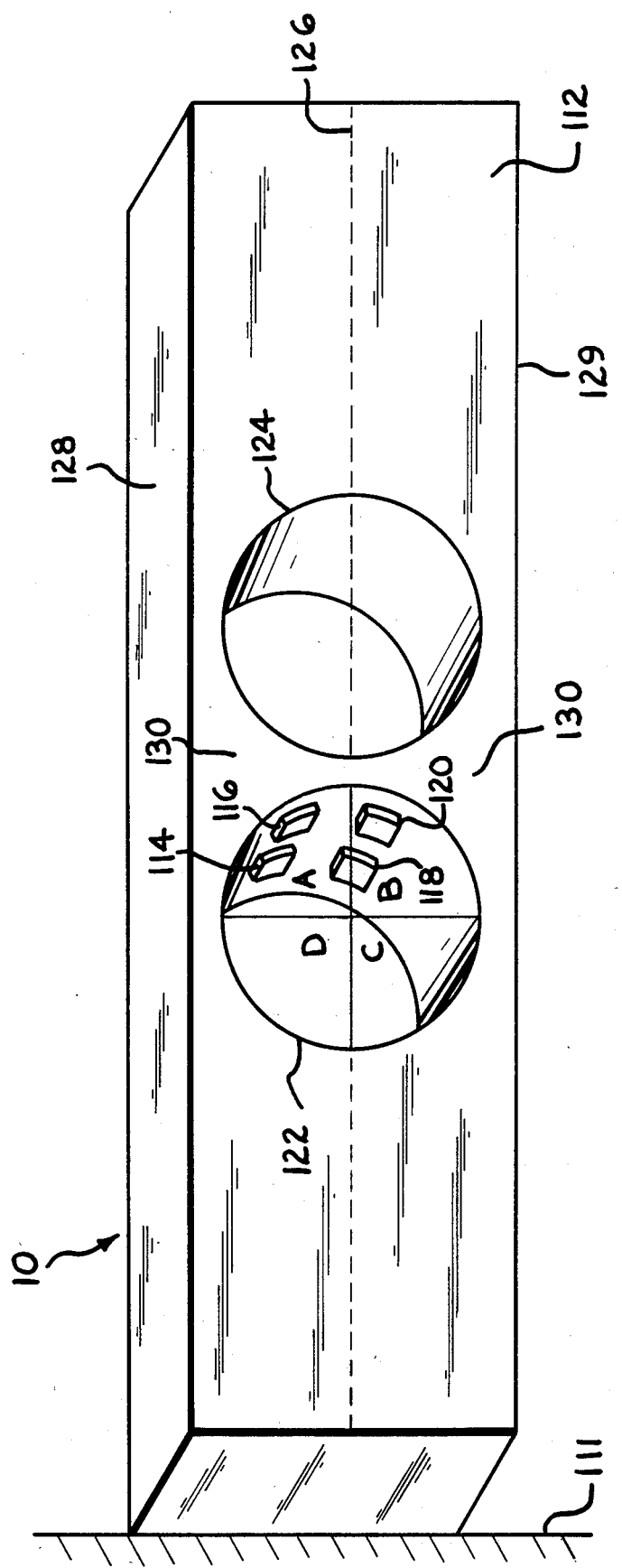
FIG. 2 is a side perspective view of a cantilever support beam assembly for a load cell according to the present invention wherein all the strain gages are located in one opening.

A support beam assembly 10 for a load cell is shown rigidly attached to a rigid support member 11 in FIG. 1. The assembly 10 consists of support beam 12 and four strain gages 14, 6, 18 and 20 which are connected in a wheatstone bridge circuit (not shown). The support beam 12 is a longitudinally extending member which as shown in FIG. 2 has a rectangular cross-section. The beam 12 can be made from any elastic material with metal being the most commonly used material of construction. In the embodiment shown in FIG. 1, the support beam material is aluminum.

Load cells such as the present one use strain gages to measure the strains that load W places upon the beam 12. With no load applied to the load cell, the bridge circuit containing the strain gages is electronically balanced to give a zero reading. When a load is applied at some point along the beam, strains are set up in the load cell which are sensed by the strain gages and place the bridge circuitry in a state of imbalance. The amount of strain that the load cell senses is in turn representative of the weight of the load in a properly designed load cell. The key to the precision of applicant's invention lies in the design of the support beam and the location of the strain gages.

Referring to FIG. 1, two openings 22 and 24 are drilled completely through the sidewalls of support beam 12. In FIG. 1, the two openings are cylindrical holes but other non-symmetrical openings have been found to work equally well. Cylinders were used because they happen to be the easiest shape to machine through the support beam 12. The axes of cylindrical holes 22 and 24 are perpendicular to the longitudinal axis 26 of support beam 12. Cylindrical hole 22 has a radius r and cylindrical hole 24 has a radius r'. In FIG. 1, r is equal to r' but this is not necessary for effective operation of the present invention.

Separating the two cylindrical holes 22 and 24 is a central region or vertical web 30. This web 30 must be present between the holes 22 and 24 to achieve the objects of the present invention. The parameters defining this vertical web 30 are important to the precision of the load cell according to the present invention. Vertical web 30 has an area of minimum thickness l at or near the longitudinal axis 26 of support beam 12. The distance l between the cylindrical holes 22 and 24, as measured along the longitudinal axis 26 of support beam 12, should always be less than the length of the smaller of the radii r and r'. Similarly, each distance l' should also be less than the length of the smaller of the radii r and r'. l' is the measure of the distance between the point on the top and bottom of each of the openings 22 and 24 which is closest to the respective top 28 and bottom 29 of support beam 12. (When either of the openings are non-cylindrical, the distances l and l' should be less than the larger width of either of the two openings 22 and 24). Given these parameters, the vertical web 30 somewhat resembles a pair of triangles with their apexes meeting at an area of minimum thickness at or near the longitudinal axis 26 of support beam 12.

Each cylindrical hole 22 and 24, can be divided into four quadrants marked A, B, C and D, respectively. With respect to holes 22 and 24, quadrants A and B are located adjacent vertical web 30, while quandrants C and D are located opposite the vertical web 30. Also note that quadrants A and D lie above the longitudinal axis 26 of support beam 12 while quadrants B and C lie below the longitudinal axis 26.

A strain gage is located in each quadrant of each hole 22 and 24 which is adjacent the vertical web 30. Thus, in each hole a strain gage will lie above and below the area of minimum thickness located at the longitudinal axis 26. Strain gage 14 is located above the longitudinal axis 26 in quadrant A of cylindrical hole 22. As can be seen in FIG. 1, strain gage 14 is mounted to the concave surface of quadrant A adjacent the vertical web 30. Strain gage 16 is mounted in quadrant B, on the concave surface which is adjacent the vertical web 30 in cylindrical hole 22 and below the area of minimum thickness. Strain gages 18 and 20 are mounted in a similar fashion on the concave surfaces of cylinder 24 in quadrants A and B, respectively.

When a load W is applied along the beam 12, it causes strains in the beam. Testing has indicated that the design of the vertical web region 30 only causes it to see strains resulting form the load W. Other strains caused by bending and twisting of the beam 12 are not sensed by this web 30 which means that gage creep is kept to a minimum. This is because the web region 30 resembles a free body. The forces due to the bending simply stretch the top part of the web 30 and compress the bottom part without changing the shape of the portion of the web where the gages 14, 16, 18 and 20 are located. Any strains which are introduced into the gage area due to bending or twisting will be very small. As a result, the imbalance in the strain gage circuitry and the resultant output signal will essentially be a function only of the actual force the load W is exerting upon the load cell. What a beam, according to the present invention, actually senses is thus the parallel movement of one end of the beam versus the other. This parallel movement causes the two "triangles" of the vertical web 30 to rotate horizontally in different directions. It is this movement induced strain that the gages sense and which is in turn a measure of the force of the load W.

Once the cantilever support beam assembly 10 is completed, the strain gages 14, 16, 18 and 20 are connected in a bridge circuit and the circuit is then balanced electronically while the support beam 12 is at rest with no load applied. With the beam balanced, a linearity test was run using varying loads from 0 pounds to 8 pounds in two pound increments. The results of this test are shown in Table I below.

TABLE I

| | Linearity Test | |
| Load Pounds | Reading | Linear Value |
| --- | --- | --- |
| 0 | 0 | 0 |
| 2 | 1081 | 1081 |
| 4 | 2161 | 2161 |
| 6 | 3243 | 3243 |
| 8 | 4324 | 4324 |
| 6 | 3243/4 | 3243 |
| 4 | 2162 | 2162 |
| 2 | 1081 | 1081 |
| 0 | 0 | 0 |

From Table I it can be seen that the load cell using the improved cantilever support beam assembly gives accurate linear results. For example, when a 2 pound load is applied, a reading of 1081 is recorded. When the load is increased threefold to six pounds, the recorded reading is also increased threefold to a value of 3243. This indicates that a support beam assembly according to the present invention yields very accurate results which are directly proportional to the load applied.

During testing of the present invention, strain gages were placed at various positions about the interior surfaces of holes 22 and 24 in an attempt to determine where the strain levels were constant, which meant very accurate readings, and where the strain levels were varying to an unacceptable degree. From the testing it was determined that the strain gages must be located adjacent the vertical web 30 for accurate load readings. Strain gages which are positioned further away from the web 30 than the four points marked E in FIG. 1 will have strain levels that vary with the load position. This is unacceptable in load cell design. With the present invention, accurate readings are given irrespective of the position of the load W along the length of the beam 12 beyond the holes 22 and 24.

Another common location for strain gages is on the exterior surfaces of the thin sections marked G in FIG. 1. See for example, Kawai et al., U.S. Pat. No. 4,212,197 and Jacobson et al., U.S. Pat. No. 4,146,100, wherein the strain gages are placed on the upper and lower exterior surfaces of a longitudinally extending beam. Stresses are present at these positions and the magnitude of these stresses is dependent upon both the thickness of the section G and upon the application point of the load W. These stresses are sensed by the strain gages and can cause the load cell to give inaccurate readings. In addition, when the strain gages are separated by large distances, as they are when positioned on the exterior surfaces of the beam 12, temperature gradients greatly affect the responses of the strain gages which in turn affect the overall accuracy of the load cell. With applicant's invention the strain gages 14, 16, 18 and 20 are located in close proximity to one another about the vertical web 30. As a result, the temperature gradients are much smaller and thus the error in the readings due to temperature is negligible.

Other embodiments of the present invention were also tested and found to work well so long as there existed the vertical web region 30 and the strain gages were placed adjacent the vertical web in positions above and below the area of minimum thickness. FIG. 2 shows a support beam 112 similar to the support beam 12 in FIG. 1 except for the location of the strain gages 114, 116, 118 and 120. In FIG. 2, all four strain gages 114, 116, 118 and 120 are located in just one of the openings, cylindrical hole 122. Strain gages 114 and 116 are positioned side by side above the area of minimum thickness and adjacent the vertical web 30 in quadrant A. Strain gages 118 and 120 are positioned side by side below the area of minimum thickness and adjacent the vertical web 30 in quadrant B. With this configuration the strain gages still sense the parallel movement of one end of the beam 112 versus the other which causes the two "triangles" of web 30 to rotate horizontally in different directions. As a result, accurate readings of the load W are also achieved irrespective of the load W's location along the beam 112.

Figure 3:
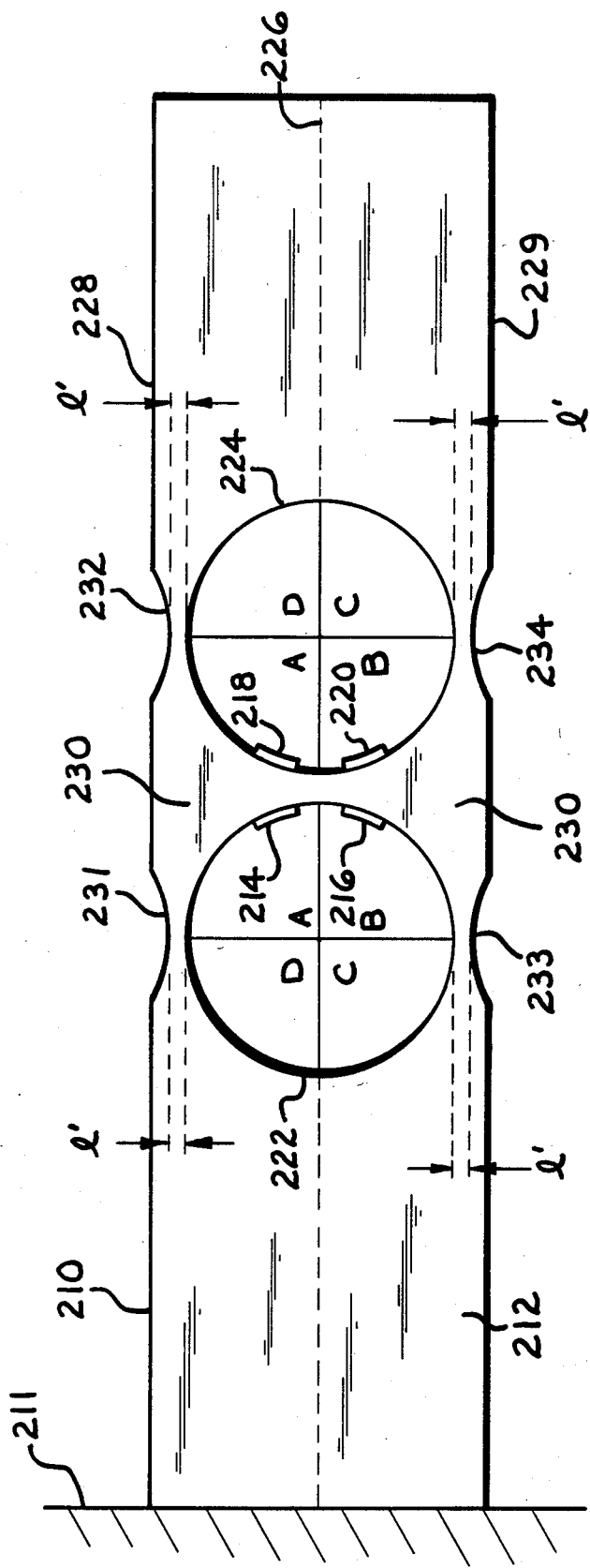
FIG. 3 is a side elevational view of another cantilever support beam assembly for a load having concave recesses in the top and bottom surfaces of the beam, according to the present invention.

FIG. 3 shows a beam 212 which is similar to beam 12 in FIG. 1 except for the concave recesses 231, 232, 233 and 234 in the top and bottom surfaces 228 and 229 directly above and below cylindrical holes 222 and 224. By placing the recesses in the beam 212, the sections 1' are made thinner thus making the vertical web 230 more independent.

Figure 4:
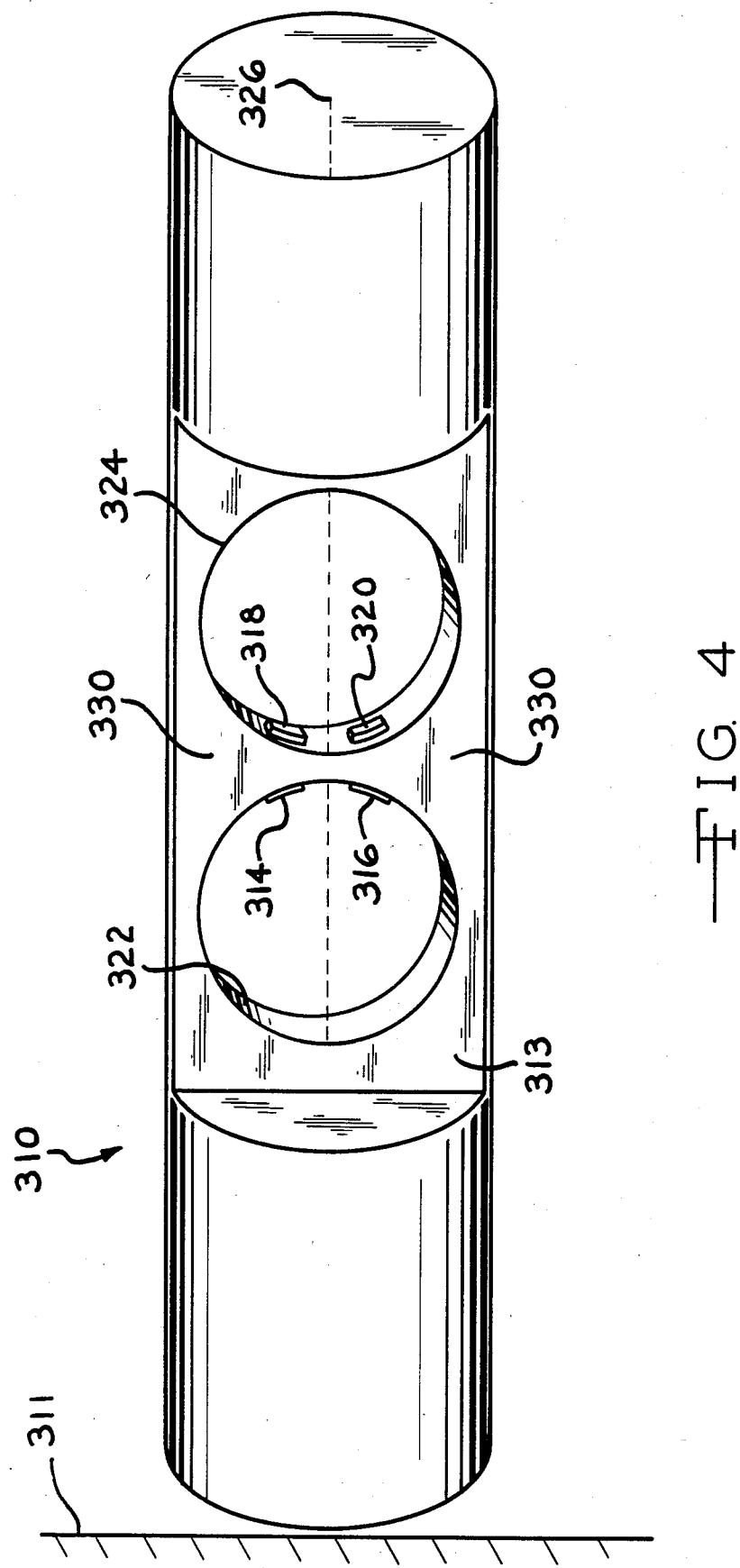
FIG. 4 is a side elevational view of another cantilever support beam assembly for a load cell having a side area of reduced cross-section, according to the present invention.

Finally, FIG. 4 shows a cylindrically shaped support beam 312 with an area of reduced cross-section 313. Within this area of reduced cross-section 313, there are two cylindrical holes 322 and 324 with a vertical web 330 and strain gages 314, 316, 318 and 320 positioned just as those shown in FIG. 1. Here again, because of the vertical web 330 and the placement of the strain gages 314, 316, 318 and 320 adjacent the web 30 accurate readings of the load W are achieved irrespective of the location of the load W along beam 312.

The foregoing demonstrates that the present invention yields a cantilever support beam assembly for a load cell and the like with improved accuracy. Having thus described the present invention in detail and with reference to the accompanying drawings, it should be understood that various modifications and changes may be made without departing from the spirit and scope of the following claims.

What I claim is:

1. A cantilever beam assembly for a load cell comprising a longitudinally extending support beam having opposed sidewalls, two adjacent parallel and independent openings extending completely through the sidewalls of said beam, said beam completely surrounding each of said independent and parallel openings, a vertical web between said two openings and gages located adjacent said vertical web in at least one of said two openings.

2. A cantilever beam assembly for a load cell comprising a longitudinally extending support beam having opposed sidewalls, two adjacent parallel openings extending completely through the sidewalls of said beam, said beam completely surrounding each of said parallel openings, a vertical web between said openings having a minimum thickness less than the largest width of either of said two openings and at least four strain gages located in at least one of said two openings adjacent said minimum thickness of said vertical web.

3. A cantilever beam assembly for a load cell comprising a generally rectangular shaped support beam rigidly attached at one end to a rigid member, said beam having a longitudinal axis and opposed sidewalls, first and second parallel cylindrical holes extending completely through the side walls of said beam, said parallel cylindrical holes being perpendicular to such longitudinal axis of said support beam, said beam completely surrounding each of said parallel cylindrical holes, said first and second cylindrical holes defining a vertical web between said first and second cylindrical holes having a minimum thickness less than the radius of either of said first or second cylindrical holes, a pair of vertically aligned strain gages located on the interior portions of each of said first and second cylindrical holes adjacent said minimum thickness of said web for measuring strains in said load cell.

4. A cantilever beam assembly for a load cell according to claim 3, wherein said beam has opposed top and bottom surfaces with concave recesses in said surfaces located above and below said first and second cylindrical holes.

5. A cantilever beam assembly for a load sell comprising a cylindrical support beam rigidly attached at one end to a rigid member, said beam having a side area of reduced cross-section, first and second parallel cylindrical holes extending completely through said area of reduced cross-section, said beam completely surrounding each of said parallel cylindrical holes, said first and second holes defining a vertical web between said parallel holes, a pair of strain gages located in each of said parallel holes adjacent said minimum thickness of said web, said strain gages being in vertical alignment in each of said parallel holes for measuring strains in said beam when a load is applied along said beam.

6. A cantilever beam assembly for a load cell comprising a longitudinally extending rectangular support beam attached at one end to a rigid member, said support beam having sidewalls and a top and a bottom surface, first and second parallel cylindrical holes extending completely through said sidewalls of said beam, said beam completely surrounding each of said parallel cylindrical holes, said first and second parallel cylindrical holes defining a vertical web between said first and second parallel holes, said web having a minimum thickness, first, second, third and fourth strain gages being located on the interior surfaces of said first and second parallel holes respectively, said first and third strain gages being located on the interior surfaces of said first and second parallel holes respectively at a point adjacent said web and above said minimum thickness, said second and fourth strain gages being located on the interior surfaces of said first and second parallel holes respectively at a point adjacent said web and below said mininum thickness.

7. A cantilever beam assembly for a load cell according to claim 6, wherein said top and bottom surfaces of said support beam have concave recesses located above and below said first and second parallel cylindrical holes.

* * * * *